(12) United States Patent
Kuo et al.

(10) Patent No.: US 9,709,957 B1
(45) Date of Patent: Jul. 18, 2017

(54) SMART WRISTWATCH STRUCTURE

(71) Applicant: PRINCO CORP., Hsinchu (TW)

(72) Inventors: Chi-Pin Kuo, Hsinchu (TW); Ying-Che Shih, Hsinchu (TW); Cheng-Yi Chang, Hsinchu (TW)

(73) Assignee: PRINCO CORP., Hsinchu (TW)

( * ) Notice: Subject to any disclaimer, the term of this patent is extended or adjusted under 35 U.S.C. 154(b) by 0 days.

(21) Appl. No.: 15/166,977

(22) Filed: May 27, 2016

(30) Foreign Application Priority Data

Jan. 12, 2016 (TW) .............................. 105100824 A

(51) Int. Cl.
| | |
|---|---|
| G04R 60/06 | (2013.01) |
| G04G 21/04 | (2013.01) |
| H04W 4/00 | (2009.01) |
| G04B 37/12 | (2006.01) |
| G04R 60/10 | (2013.01) |

(52) U.S. Cl.
CPC .............. *G04B 37/12* (2013.01); *G04G 21/04* (2013.01); *G04R 60/06* (2013.01); *G04R 60/10* (2013.01); *H04W 4/008* (2013.01)

(58) Field of Classification Search
CPC ........ G04R 60/00; G04R 60/06; G04R 60/10; G04G 21/04; H04W 4/008
See application file for complete search history.

(56) References Cited

U.S. PATENT DOCUMENTS

| | | | | |
|---|---|---|---|---|
| 5,331,608 | A * | 7/1994 | Umemoto ............. | G04G 21/04 368/10 |
| 6,484,947 | B1 * | 11/2002 | Miyata ................... | G06K 19/04 235/487 |
| 8,654,018 | B2 * | 2/2014 | Warther ............... | G06K 19/041 343/718 |
| 8,773,847 | B2 * | 7/2014 | Byun ..................... | H04B 1/385 361/679.03 |
| 2006/0140058 | A1 * | 6/2006 | Kalbermatten ........ | G04G 21/04 368/47 |
| 2010/0097896 | A1 * | 4/2010 | Baba ....................... | G01S 19/14 368/47 |

(Continued)

FOREIGN PATENT DOCUMENTS

| | | |
|---|---|---|
| TW | M241814 U | 8/2004 |
| TW | M353391 U | 3/2009 |
| TW | 201531822 A | 8/2015 |

(Continued)

OTHER PUBLICATIONS

Office Action issued in corresponding Taiwanese Application No. 105100824 dated Aug. 22, 2016 (5 pages).

*Primary Examiner* — Vit W Miska

(74) *Attorney, Agent, or Firm* — Osha Liang LLP

(57) ABSTRACT

A smart wristwatch structure includes a glass, a dial, a watch case, a bottom case, a movement, an antenna, a functional module, and a dedicated battery. The dial, the watch case, and the bottom case construct an accommodating space from top to bottom. The antenna is adhered to a lower surface of the glass. The functional module is disposed in the accommodating space for wirelessly communicating with a mobile terminal. The dedicated battery provides power for the functional module or the movement. In the smart wristwatch structure, signals are not shielded, and the thickness of the watch case is not increased significantly.

7 Claims, 8 Drawing Sheets

(56) References Cited

U.S. PATENT DOCUMENTS

2011/0255379 A1* 10/2011 Vidal .................... G04G 9/047
368/70
2014/0321248 A1* 10/2014 Fujisawa ................ G04R 20/02
368/47

FOREIGN PATENT DOCUMENTS

| TW | M507000 U | 8/2015 |
| TW | M515703 U | 1/2016 |
| TW | 586054 B | 8/2016 |

* cited by examiner

SMART WRISTWATCH STRUCTURE

TECHNICAL FIELD OF THE INVENTION

The present invention relates to a wristwatch, and more particularly to a smart wristwatch structure.

BACKGROUND OF THE INVENTION

Currently, it is increasingly common to manufacture a smart wristwatch by disposing a wireless antenna and a functional module in a wristwatch. A chip antenna, a helix or spiral antenna, a patch antenna, or a loop antenna is usually utilized in the conventional smart wristwatch for receiving and transmitting signals. The above-mentioned antennas are a type of electromagnetic antenna. That is, the above-mentioned antennas receive and transmit signals by an electromagnetic field.

The conventional smart wristwatch structure usually comprises a glass, a dial, a watch case, and a bottom case. The dial, the watch case, and the bottom case construct an accommodating space from top to bottom. The antenna is disposed in the accommodating space inside the smart wristwatch or in the watch case. However, the dial, the watch case, and the bottom case of the conventional smart wristwatch are generally made of metal. The metal has the characteristics of shielding signals. Accordingly, the signals received or transmitted by the antenna disposed in the accommodating space or in the watch case of the conventional smart wristwatch are affected by the watch case, the bottom case, and the dial which are made of metal.

Even if at least one of the dial, the watch case, and the bottom case constructing the accommodating space is not made of metal or a part of at least one of the dial, the watch case, and the bottom case is not made of metal, the antenna is still affected by the objects (the watch case, the bottom case, and the dial) constructing the accommodating space, a movement, a functional module, or a battery in the accommodating space because the antenna is in the accommodating space or in the watch case. As a result, a wireless communication distance between the antenna and a mobile terminal is significantly reduced.

Please refer to FIG. 1. FIG. 1 shows a conventional smart wristwatch structure. The smart wristwatch structure comprises a watch case 20', a functional module 18", a dedicated battery 24", and a bottom case 26'. The dedicated battery is utilized for providing power required by the functional module. The dedicated battery 24" is stacked between the watch case 20' and the bottom case 26'. Accordingly, a thickness of the conventional smart wristwatch is increased, and a size of the conventional smart wristwatch is large. Currently, the smart wristwatches in the market have the problems that the thickness is increased and the size is large.

Consequently, there is a need to solve the above-mentioned problems of the antenna and the dedicated battery in the prior art.

SUMMARY OF THE INVENTION

An objective of the present invention is to provide a smart wristwatch structure which can solve the problem that signals are affected by objects constructing an accommodating space, a movement, a functional module, or a battery in the prior art.

Another objective of the present invention is to provide a smart wristwatch structure which can solve the problem of accommodating a battery and the problem that a thickness of a conventional wristwatch is increased because of the dedicated battery used for a functional module.

To achieve the above-mentioned objectives, the smart wristwatch structure of the present invention comprises: a glass; a dial; a watch case; a bottom case; an antenna; and a functional module. The dial, the watch case, and the bottom case construct an accommodating space from top to bottom. The antenna is adhered to a lower surface of the glass. The functional module is disposed in the accommodating space for wirelessly communicating with a mobile terminal.

To achieve the above-mentioned objectives, the smart wristwatch structure of the present invention comprises: a glass; a dial; a watch case; a bottom case; an antenna; a movement; a functional module; and a dedicated battery. The dial, the watch case, and the bottom case constructing an accommodating space from top to bottom. The antenna is adhered to a lower surface of the glass. The movement disposed in the accommodating space. The functional module is disposed in the accommodating space for wirelessly communicating with a mobile terminal. The dedicated battery surrounds the movement.

To achieve the above-mentioned objectives, the smart wristwatch structure of the present invention comprises: a glass; a dial; a watch case; a bottom case; an antenna; a movement; and a dedicated battery. The dial, the watch case, and the bottom case constructing an accommodating space from top to bottom. The antenna is adhered to a lower surface of the glass. The movement and a functional module are integrated in module. The movement integrated with the functional module is disposed in the accommodating space for wirelessly communicating with a mobile terminal and driving at least one indicator to show time. The dedicated battery surrounds the movement.

In the smart wristwatch structure of the present invention, the antenna is disposed beneath the lower surface of the glass instead of being disposed in the accommodating space or inside the watch case. As a result, when the antenna transmits or receives signals, the signals are not shielded by the watch case.

Even if at least one of the objects constructing the accommodating space (the dial, the watch case, and the bottom case) is not made of metal or a part is not made of metal, the antenna is not affected because the antenna is disposed beneath the lower surface of the glass. Furthermore, since the antenna is far from the dial, the watch case, and the bottom case constructing the accommodating space and far from the movement, the functional, and the battery, a wireless communication distance can be larger when the antenna communicates with a mobile terminal.

Furthermore, in the smart wristwatch structure of the present invention, the battery used for providing the power for the functional module surrounds the movement. Accordingly, the required thickness of the watch case is approximately equal to the thickness of the movement, and the required thickness of the watch case can be reduced.

DETAILED DESCRIPTION OF THE INVENTION

To make the objectives, technical schemes, and technical effects of the present invention more clearly and definitely, the present invention will be described in details below by using embodiments in conjunction with the appending drawings. It should be understood that the specific embodiments described herein are merely for explaining the present invention, and as used herein, the term "embodiment" refers to an instance, an example, or an illustration but is not intended to limit the present invention. In addition, the articles "a" and "an" as used in the specification and the appended claims should generally be construed to mean "one or more" unless specified otherwise or clear from the context to be directed to a singular form. Also, in the appending drawings, the components having similar or the same structure or function are indicated by the same reference number.

Figure 1:
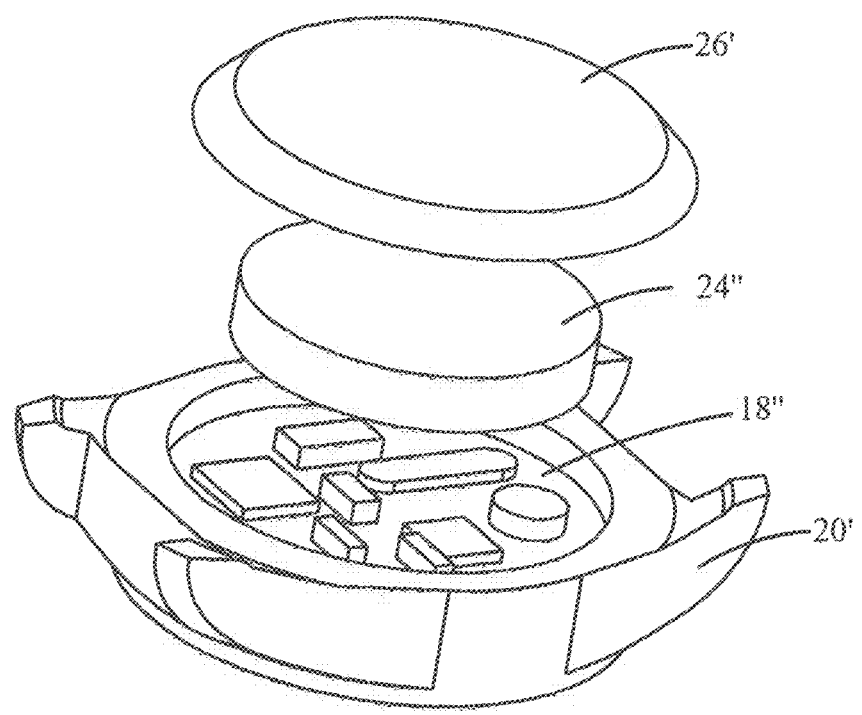
FIG. 1 shows a conventional smart wristwatch structure.
Figure 2:
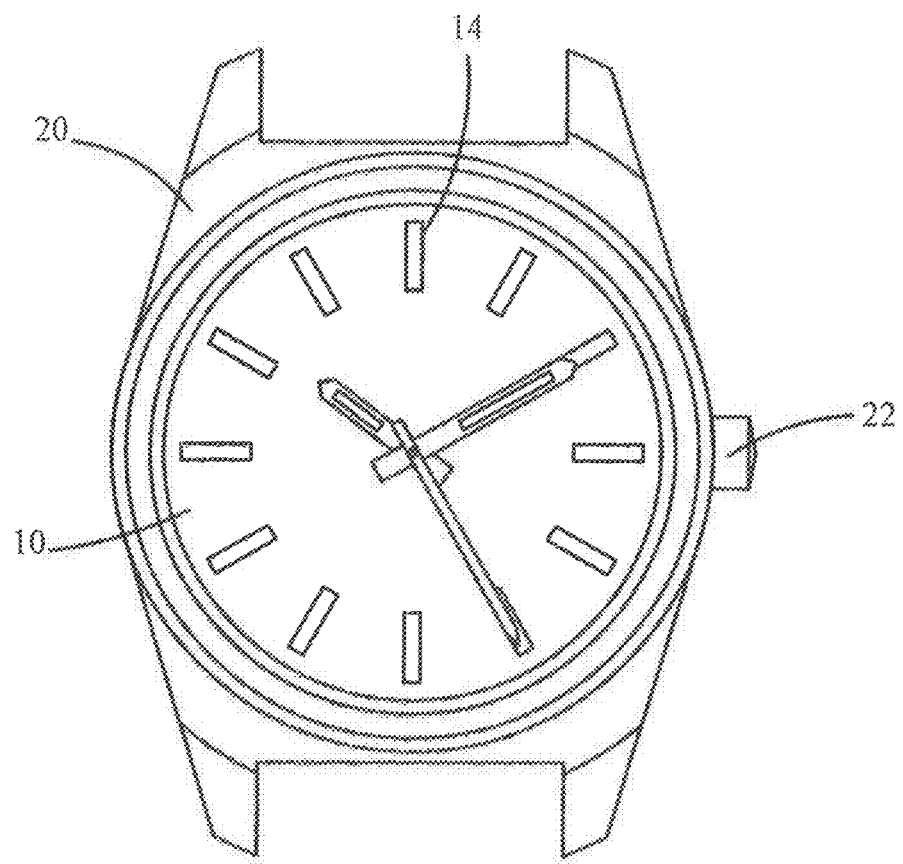
FIG. 2 shows a top view of a smart wristwatch structure in accordance with a first embodiment of the present invention.
Figure 3:
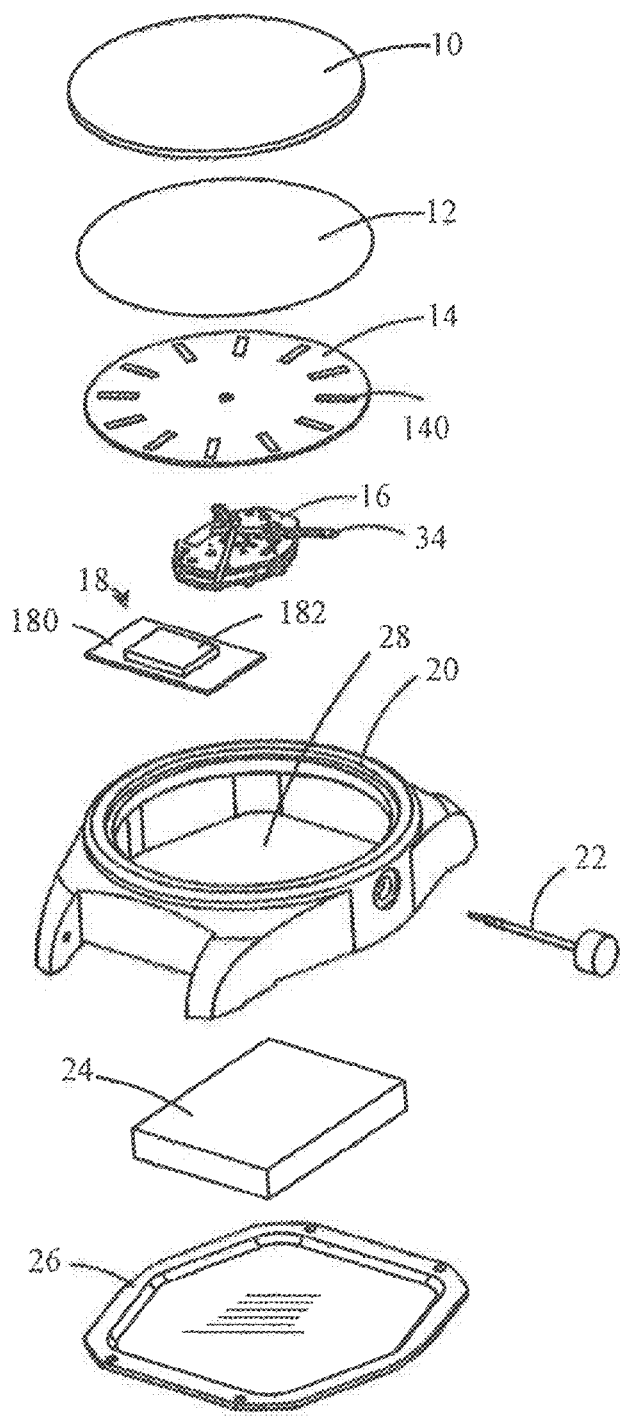
FIG. 3 shows an exploded view of the smart wristwatch structure shown in FIG. 1.
Figure 4:
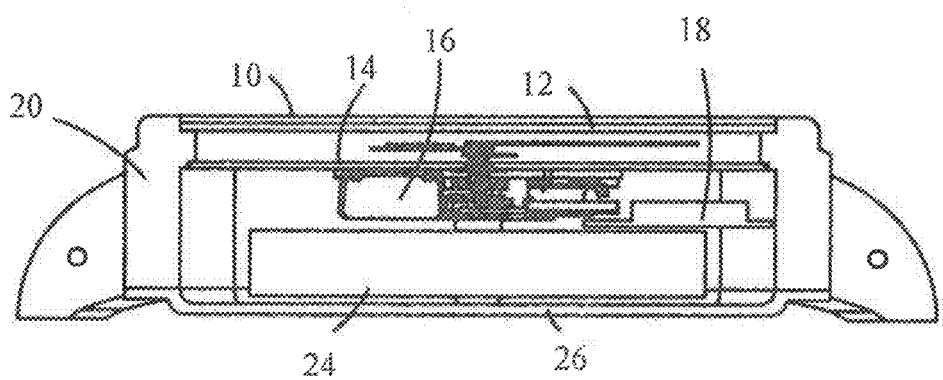
FIG. 4 shows a sectional view of the smart wristwatch structure shown in FIG. 2.

Please refer to FIG. 2, FIG. 3, and FIG. 4. FIG. 2 shows a top view of a smart wristwatch structure in accordance with a first embodiment of the present invention. FIG. 3 shows an exploded view of the smart wristwatch structure shown in FIG. 1. FIG. 4 shows a sectional view of the smart wristwatch structure shown in FIG. 2.

The smart wristwatch structure in accordance with the present invention comprises a glass 10, an antenna 12, a dial 14, a movement 16, a functional module 18, a watch case 20, a crown 22, a battery 24, and a bottom case 26. The dial 14, the watch case 20, and the bottom case 26 construct an accommodating space 28 from top to bottom.

The glass 10 is a transparent material. A main feature of the present invention is that the antenna 12 is disposed beneath and adhered to a lower surface of the glass 10 instead of being disposed inside the watch case 20 of the smart wristwatch structure or in the accommodating space 28. As a result, when the antenna 12 transmits or receives signals, the signals are not shielded by the watch case 20. Preferably, the antenna may be manufactured of light transmitting material.

The dial 14 has physical scales 140 (e.g., one o'clock to twelve o'clock) disposed thereon. Indicators (e.g., physical hands including an hour hand, a minute hand, and a second hand) are arranged above the dial 14. The indicators are driven by the movement 16 and cooperate with the scales 140 on the dial 14 to show the time. Through the transparent glass 10 and the antenna 12, a user can perceive the position information (i.e., time information) indicated by the indicators.

The dial 14, the watch case 20, and the bottom case 26 are used to protect the mechanical structures and/or electronic devices inside the smart wristwatch structure.

The smart wristwatch structure has the crown 22 disposed at the lateral side thereof. The user can adjust the correct time or set an alarm by turning a knob on the crown 22.

The battery 24 can provide the power required by the movement 16 and/or the functional module 18. The battery 24 may be a primary battery or a secondary battery. The movement 16 and the functional module 14 cooperate with a mobile terminal. Specifically, the functional module 18 can wirelessly communicate with the mobile terminal. It is note that the functional module 18 can also be deployed on a watch strap of the smart wristwatch structure.

In the present embodiment of the present invention, the battery 24 can provide the power for the movement 16 and the functional module 18. That is, the movement 16 and the functional module 18 (and other elements inside the smart wristwatch structure) can use the power stored in the battery 24 at the same time. In another embodiment, the movement 16 and the functional module 18 can respectively have independent batteries and power supply systems. That is, the movement 16 and the functional module are powered by different batteries.

Figure 5:
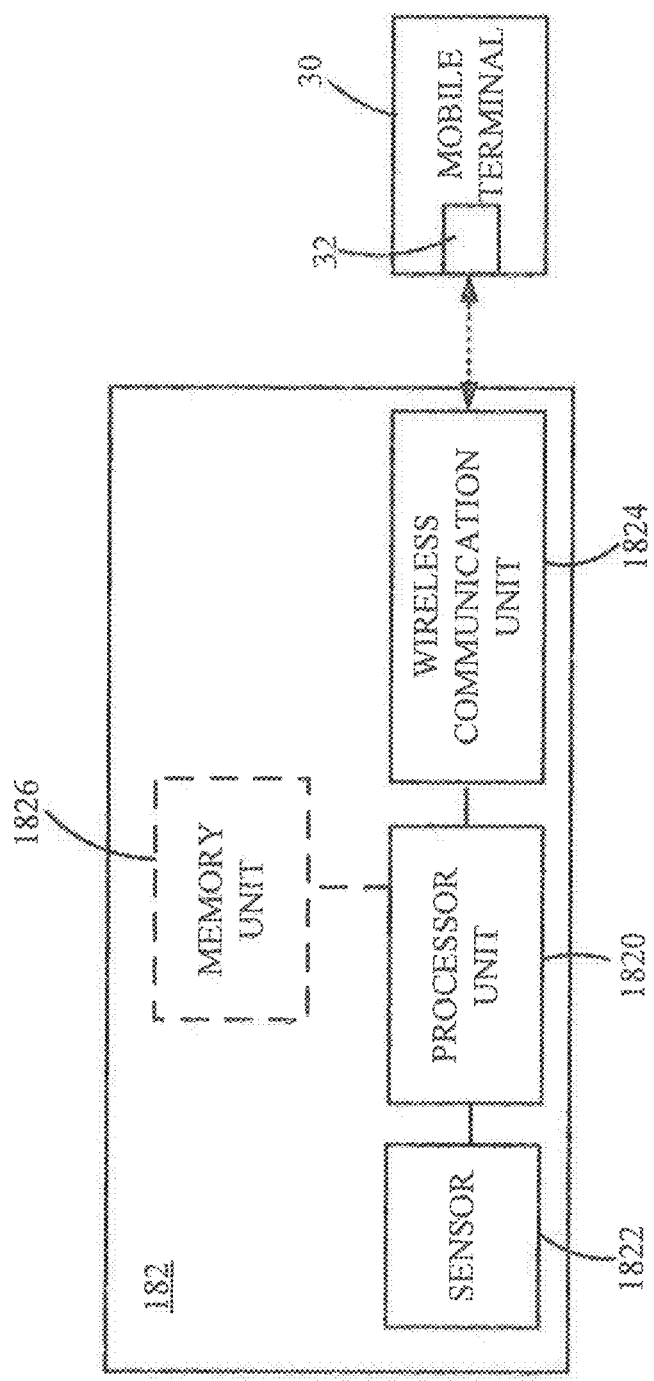
FIG. 5 shows a wireless communication between a controlling unit and a mobile terminal in accordance with the present invention.

As shown in FIG. 3, the functional module 18 comprises an electrical connection substrate 180 and a controlling unit 182 disposed on the electrical connection substrate 180. Please refer to FIG. 5. FIG. 5 shows a wireless communication between the controlling unit 182 and a mobile terminal 30 in accordance with the present invention. The controlling unit 182 of the present invention comprises a processor unit 1820, a sensor 1822, and a wireless communication unit 1824. The processor unit 1820, the sensor 1822, and the wireless communication unit 1824 can be packaged into a monolithic packaging structure, such as a SiP (System in Package) structure, on the electrical connection substrate 180, and can also be individually packaged or any two of them are integrated into one package, and then electrical signal transmission is accomplished by layout structure on a same or different electrical connection substrates. The electrical connection substrate 180 can be implemented by a flexible multi-layer substrate or a rigid one, which has a plurality of metal layers and a plurality of dielectric layers. The metal layers are distributed between the respective dielectric layers and are used to transmit electrical signals. The material of the dielectric layers may be polyimide and the dielectric layers may be formed by spin coating. The functional module 18 may also comprise a memory unit 1826. The memory unit 1826 is utilized for storing the data required by the processor unit 1820. Also, the memory unit 1826 can be integrated into the processor unit 1820. The mobile terminal 30 has a wireless signal transceiver 32 for receiving and transmitting wireless signals. For example, the wireless signal transceiver 32 may be implemented by a Bluetooth transceiver or an NFC (Near Field Communication) transceiver.

Figure 6:
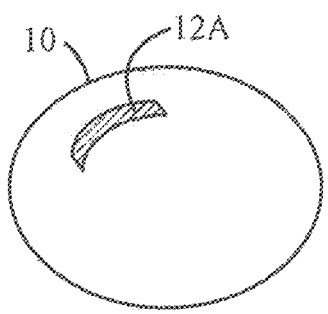
FIG. 6 shows that an antenna is adhered to a glass in accordance with a first embodiment of the present invention.

Please refer to FIG. 6. FIG. 6 shows that an antenna 12A is adhered to the glass 10 in accordance with a first embodiment of the present invention.

In the present embodiment, the antenna 12A is only adhered to a part of the lower surface of the glass 10 and is a monopole antenna. The monopole antenna is a conductive film made of metal mesh, nano metal wire, or graphene.

In the present embodiment, a transmittance of the antenna 12A is greater than 70%. Accordingly, when the user checks the time through the glass 10 in FIG. 2, the user is less affected by the antenna 12A.

Figure 7:
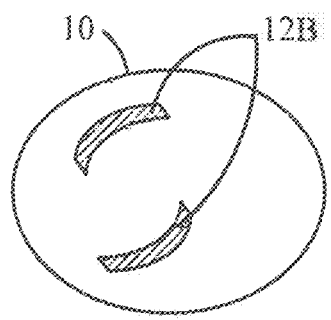
FIG. 7 shows that an antenna is adhered to the glass in accordance with a second embodiment of the present invention.

Please refer to FIG. 7. FIG. 7 shows that an antenna 12B is adhered to the glass 10 in accordance with a second embodiment of the present invention.

In the present embodiment, the antenna 12B is only adhered to a part of the lower surface of the glass 10 and is a dipole antenna. The dipole antenna is a conductive film made of metal mesh, nano metal wire, or graphene.

In the present embodiment, a transmittance of the antenna 12B is greater than 70%. Accordingly, when the user checks the time through the glass 10 in FIG. 2, the user is less affected by the antenna 12B.

Figure 8:
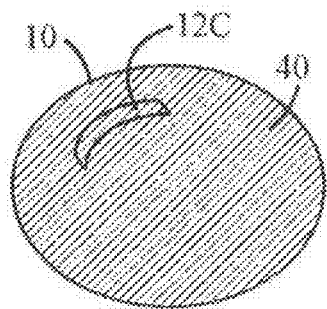
FIG. 8 shows that an antenna is adhered to the glass in accordance with a third embodiment of the present invention.

Please refer to FIG. 8. FIG. 8 shows that an antenna 12C is adhered to the glass 10 in accordance with a third embodiment of the present invention.

In the present embodiment, the antenna 12C is only adhered to a part of the lower surface of the glass 10 and is a monopole antenna. A conductive film 40 is adhered to the other part (i.e. the part which the antenna 12C is not adhered to) of the lower surface of the glass 10. The antenna 12C and the conductive film 40 may be conductive films. The monopole antenna and the conductive film 40 may be made of metal mesh, nano metal wire, or graphene.

A method for manufacturing the antenna 12C and the conductive film 40 is to form a complete conductive film on the lower surface of the glass 10 firstly. Then, the complete conductive film is split into the antenna 12C and the conductive film 40 by laser patterning. A slit is formed between the conductive film 40 and the antenna 12C. The antenna 12C and the conductive film 40 are electrically disconnected from each other. The antenna 12C is not affected by the conductive film 40 when the antenna 12C transmits or receives signals.

In the present embodiment, the antenna 12C and the conductive film 40 have the same transmittance or approximate transmittances. Accordingly, when the user checks the time through the glass 10 in FIG. 2, the user is less affected by the antenna 12C.

Figure 9:
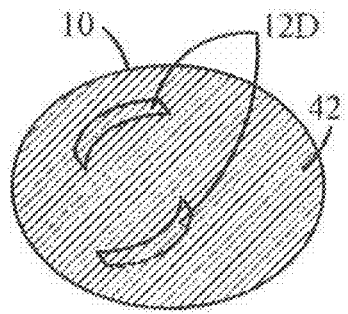
FIG. 9 shows that an antenna is adhered to the glass in accordance with a fourth embodiment of the present invention.

Please refer to FIG. 9. FIG. 9 shows that an antenna 12D is adhered to the glass 10 in accordance with a fourth embodiment of the present invention.

In the present embodiment, the antenna 12D is only adhered to a part of the lower surface of the glass 10 and is a dipole antenna. A conductive film 42 is adhered to the other part (i.e. the part which the antenna 12D is not adhered to) of the lower surface of the glass 10. The antenna 12D and the conductive film 42 may be conductive films. The dipole antenna and the conductive film 42 may be made of metal mesh, nano metal wire, or graphene.

A method for manufacturing the antenna 12D and the conductive film 42 is to form a complete conductive film on the lower surface of the glass 10 firstly. Then, the complete conductive film is split into the antenna 12D and the conductive film 42 by laser patterning. A slit is formed between the conductive film 42 and the antenna 12D. The antenna 12D and the conductive film 42 are electrically disconnected from each other. The antenna 12D is not affected by the conductive film 42 when the antenna 12D transmits or receives signals.

In the present embodiment, the antenna 12D and the conductive film 42 have the same transmittance or approximate transmittances. Accordingly, when the user checks the time through the glass 10 in FIG. 2, the user is less affected by the antenna 12D.

It is noted that the antennas 12A-12D in FIGS. 6-9 respectively represent different embodiments. However, the antennas 12A-12D can be applied to the antenna 12 in FIG. 3.

Figure 10:
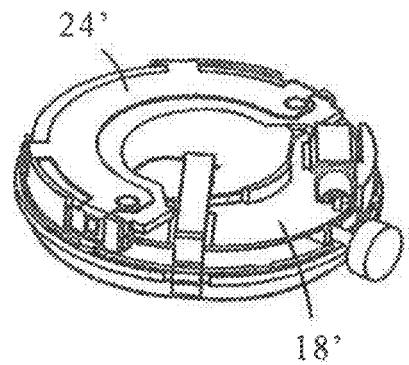
FIG. 10 shows the inside of a smart wristwatch structure in accordance with a second embodiment of the present invention.
Figure 11:
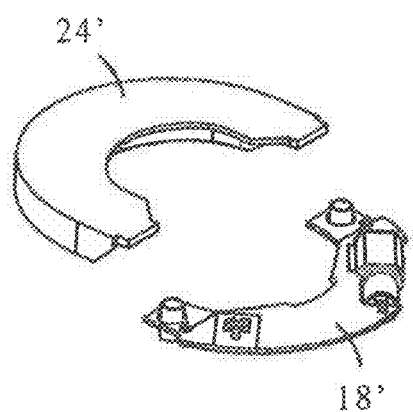
FIG. 11 shows a dedicated battery and a functional module.
Figure 12:
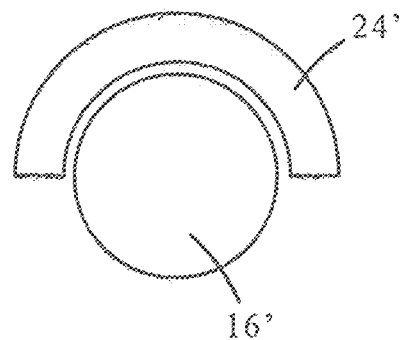
FIG. 12 shows that the dedicated battery surrounds a movement.

Please refer to FIG. 10 to FIG. 12. FIG. 10 shows the inside of a smart wristwatch structure in accordance with a second embodiment of the present invention. FIG. 11 shows a dedicated battery 24' and a functional module 18'. FIG. 12 shows that the dedicated battery 24' surrounds a movement 16'. The dedicated battery 24' is utilized for providing the power required by the functional module 18'.

A difference between the present embodiment and the first embodiment is that the smart wristwatch structure of the present embodiment comprises the additional dedicated battery 24'. In the first embodiment, the battery 24 provides the power to the movement 16 and the functional module 18. In the present embodiment, the dedicated battery 24' dedicatedly provides the power to the functional module 18'. As mentioned above, a conventional additional battery for providing the power for a functional module is stacked on a bottom case (as shown in FIG. 1). As a result, the conventional smart wristwatch has the problems that the thickness is increased and the size is large. In the present embodiment, the dedicated battery 24' and the functional module 18' respectively surround the movement 16' and are positioned below the dial 14 in FIG. 3. Since the dedicated battery 24' and the functional module 18' surround the movement 16', the dedicated battery 24', the functional module 18', and the movement 16' have the same thickness. Compared with the conventional smart wristwatch in which the battery is stacked on the bottom case, the required thickness of the watch case 20 in the smart wristwatch structure of the present embodiment is approximately equal to the thickness of the movement 16'. Accordingly, the required thickness of the watch case 20 can be reduced. Furthermore, the functional module 18' and the movement 16' can be integrated in one module. Accordingly, the dedicated battery 24' surrounds the movement 16' (which is integrated with the functional module 18').

Furthermore, it is noted that the antenna 12 in the first embodiment and the antennas 12A-12D in FIGS. 6-9 can be used in the present embodiment. Other elements are the same as those in the first embodiment and thus omitted herein.

In the smart wristwatch structure of the present invention, the antenna is disposed beneath the lower surface of the glass instead of being disposed in the accommodating space or inside the watch case. As a result, when the antenna transmits or receives signals, the signals are not shielded by the watch case. Furthermore, by using the structure in which the dedicated battery surrounds the movement, the smart wristwatch structure of the present invention can solve the problems that the thickness is increased and the size is large.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A smart wristwatch structure, comprising:
   a glass;
   a dial;

a watch case;

a bottom case, the dial, the watch case, and the bottom case constructing an accommodating space from top to bottom;

an antenna adhered to a lower surface of the glass; and a functional module disposed in the accommodating space for wirelessly communicating with a mobile terminal, wherein the antenna is adhered to a part of a lower surface of the glass, a conductive film is adhered to the other part of the lower surface of the glass, and a slit is formed between the conductive film and the antenna.

2. The smart wristwatch structure according to claim 1, wherein the antenna is a monopole antenna.

3. The smart wristwatch structure according to claim 2, wherein the monopole antenna and the conductive film are made of metal mesh, nano metal wire, or graphene.

4. The smart wristwatch structure according to claim 1, wherein the antenna is a dipole antenna.

5. The smart wristwatch structure according to claim 4, wherein the dipole antenna and the conductive film are made of metal mesh, nano metal wire, or graphene.

6. A smart wristwatch structure, comprising:

a glass;

a dial;

a watch case;

a bottom case, the dial, the watch case, and the bottom case constructing an accommodating space from top to bottom;

an antenna adhered to a lower surface of the glass, wherein the antenna is adhered to a part of a lower surface of the glass, a conductive film is adhered to the other part of the lower surface of the glass, and a slit is formed between the conductive film and the antenna;

a movement disposed in the accommodating space;

a functional module disposed in the accommodating space for wirelessly communicating with a mobile terminal; and a dedicated battery surrounding the movement.

7. A smart wristwatch structure, comprising:

a glass;

a dial;

a watch case;

a bottom case, the dial, the watch case, and the bottom case constructing an accommodating space from top to bottom;

an antenna adhered to a lower surface of the glass, wherein the antenna is adhered to a part of a lower surface of the glass, a conductive film is adhered to the other part of the lower surface of the glass, and a slit is formed between the conductive film and the antenna;

a movement, wherein the movement and a functional module are integrated in module, the movement integrated with the functional module is disposed in the accommodating space for wirelessly communicating with a mobile terminal and driving at least one indicator to show time; and a dedicated battery surrounding the movement.

* * * * *